US008860547B2

(12) United States Patent
Aichi et al.

(10) Patent No.: US 8,860,547 B2
(45) Date of Patent: Oct. 14, 2014

(54) CONTROL TERMINAL

(75) Inventors: Isao Aichi, Toyota (JP); Ichiro Akahori, Anjo (JP); Saori Noda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 13/532,942

(22) Filed: Jun. 26, 2012

(65) Prior Publication Data

US 2012/0326833 A1 Dec. 27, 2012

(30) Foreign Application Priority Data

Jun. 27, 2011 (JP) ................................ 2011-142072

(51) Int. Cl.
*G06F 13/42* (2006.01)
*G08C 17/02* (2006.01)

(52) U.S. Cl.
CPC .................................... *G08C 17/02* (2013.01)
USPC ............ 340/1.1; 340/2.1; 340/426.2; 84/612; 84/615; 84/723; 345/156; 341/20; 341/22; 341/33; 341/34

(58) Field of Classification Search
USPC ......................................... 340/1.1, 2.1, 407.1
See application file for complete search history.

(56) References Cited

U.S. PATENT DOCUMENTS 4,334,315 A * 6/1982 Ono et al. .................... 455/11.1
5,184,009 A * 2/1993 Wright et al. ............ 250/227.11
5,742,666 A * 4/1998 Alpert ........................ 455/404.2
6,380,923 B1 * 4/2002 Fukumoto et al. ............ 345/156
6,912,287 B1 * 6/2005 Fukumoto et al. ............ 381/151
7,135,637 B2 * 11/2006 Nishitani et al. ................ 84/723
7,161,079 B2 * 1/2007 Nishitani et al. ................ 84/612
7,179,984 B2 * 2/2007 Nishitani et al. ................ 84/723
7,183,480 B2 * 2/2007 Nishitani et al. ................ 84/615
7,405,725 B2 * 7/2008 Mohri et al. .................. 345/156
7,536,020 B2 * 5/2009 Fukumoto et al. ............ 381/151
7,781,666 B2 * 8/2010 Nishitani et al. ................ 84/723
8,378,967 B2 * 2/2013 Noda et al. .................... 345/156

(Continued)

FOREIGN PATENT DOCUMENTS

JP 10-198478 A 7/1998
JP 11-123183 A 5/1999
JP 2001160343 A * 6/2001 ............ H01H 35/14
JP 2008283474 A * 11/2008

OTHER PUBLICATIONS

U.S. Appl. No. 13/532,917, filed Jun. 26, 2012, Niwa et al.

(Continued)

*Primary Examiner* — George Bugg
*Assistant Examiner* — Paul Obiniyi
(74) *Attorney, Agent, or Firm* — Posz Law Group, PLC

(57) ABSTRACT

A wearable control terminal for allowing a user to control a target object includes a contact detector, an impact detector, a motion detector, and a transmitter. The contact detector is mounted on a surface of a first portion of a user's body to detect whether the first portion is in contact with or separated from a second portion of the body based on whether a closed loop conducting path is formed with the first portion and the second portion. The impact detector detects an impact on the control terminal. The motion detector detects a motion of the user based on the results of detection by the contact detector and the impact detector. The transmitter transmits a control signal to the target object according to the detected motion.

6 Claims, 6 Drawing Sheets

(56) References Cited

U.S. PATENT DOCUMENTS

| | | | | |
|---|---|---|---|---|
| 2001/0015123 | A1* | 8/2001 | Nishitani et al. | 84/615 |
| 2003/0066413 | A1* | 4/2003 | Nishitani et al. | 84/615 |
| 2003/0167908 | A1* | 9/2003 | Nishitani et al. | 84/723 |
| 2005/0207599 | A1* | 9/2005 | Fukumoto et al. | 381/151 |
| 2006/0185502 | A1* | 8/2006 | Nishitani et al. | 84/615 |
| 2010/0219989 | A1* | 9/2010 | Asami et al. | 341/20 |
| 2010/0220054 | A1* | 9/2010 | Noda et al. | 345/156 |
| 2010/0263518 | A1* | 10/2010 | Nishitani et al. | 84/612 |
| 2012/0319940 | A1* | 12/2012 | Bress et al. | 345/156 |

OTHER PUBLICATIONS

Office Action mailed Jun. 11, 2013 in the corresponding JP application No. 2011-142072 (and English translation).

* cited by examiner

CONTROL TERMINAL

CROSS-REFERENCE TO RELATED APPLICATION

This application is based on Japanese Patent Application No. 2011-142072 filed on Jun. 27, 2011, the disclosure of which is incorporated herein by reference.

TECHNICAL FIELD

The present disclosure relates to a control terminal that is worn on a user's body when being used.

BACKGROUND

US 2010/0219989 corresponding to JP-4683148 discloses a ring-shaped control terminal that is worn on a finger of a user when being used. For example, when a tip of an index finger on which the control terminal is worn comes into contact with a tip of a thumb of the same hand as the index finger, a closed loop conducting path is formed. Whether or not the closed loop conducting path is formed is electrically detected, and an apparatus is controlled based on the detection result.

Specifically, the control terminal includes a pair of ring electrodes and a current sensor. The ring electrodes are arranged in parallel in a direction along the axis of the finger. The current sensor is located outside a region enclosed by the electrodes. An alternating-current (AC) signal is applied between the electrodes. When the tip of the index finger comes into contact with the tip of the thumb, an electric current flows to a measurement point at which the current sensor measures the current. In contrast, when the tip of the index finger separates from the tip of the thumb, the current does not flow to the measurement point. Thus, the control terminal can determine whether the tip of the index finger is in contact with or separated from the tip of the thumb based on the current flowing to the measuring point. Then, according to the determination result, the control terminal sends a command to an external target apparatus to control the target apparatus.

However, the control terminal disclosed in US2010/0219989 can detect only two conditions, i.e., contact or separation between the index finger and the thumb. Therefore, it is difficult for the control terminal to send various types of commands to the target apparatus.

U.S. Pat. No. 6,380,923 corresponding to JP-7-121294A discloses two another control terminals that are worn on a body of a user when being used. In the first control terminal disclosed in U.S. Pat. No. 6,380,923 a microphone sensor is worn on each of five fingers of the user to individually detect a sound that is generated when a supporting surface such as a floor is tapped with the fingers. In the second control terminal disclosed in U.S. Pat. No. 6,380,923, a microphone sensor is worn on a wrist of the user to detect which finger taps the supporting surface based on frequency characteristics caused by difference in bones of the fingers. The control terminals disclosed in U.S. Pat. No. 6,380,923 can detect three or more conditions and send various types of commands to a target apparatus based on the detected conditions.

However, in the first control terminal disclosed in U.S. Pat. No. 6,380,923 there is a need to wear the microphone sensor on each of five fingers. Therefore, it is a bother for a user to use the first control terminal. In the second control terminal disclosed in U.S. Pat. No. 6,380,923, the finger with which the supporting surface is tapped is detected based on the frequency characteristics. Since the second control terminal needs a signal processor for analyzing the frequency characteristics, it is difficult to reduce the size of the second control terminal. The present inventors consider that the sound recorded by the microphone is transmitted to the target apparatus and that the target apparatus analyzes the frequency characteristics. However, in this case, since a large amount of information is wirelessly transmitted between the second control terminal and the target apparatus, power consumption for the wireless communication is increased.

SUMMARY

In view of the above, it is an object of the present disclosure to provide a small wearable control terminal for detecting three or more different conditions and sending multiple types of commands to a target object based on the detected conditions.

According to an aspect of the present disclosure, a wearable control terminal for allowing a user to control a target object includes a contact detector, an impact detector, a motion detector, and a transmitter. The contact detector is mountable on a surface of a first portion of a user's body to detect whether the first portion is in contact with or separated from a second portion of the body based on whether a closed loop conducting path is formed with the first portion and the second portion. The impact detector detects an impact on the control terminal. The motion detector detects a motion of the user based on the detection results of the contact detector and the impact detector. The transmitter transmits a control signal to the target object according to the detected motion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
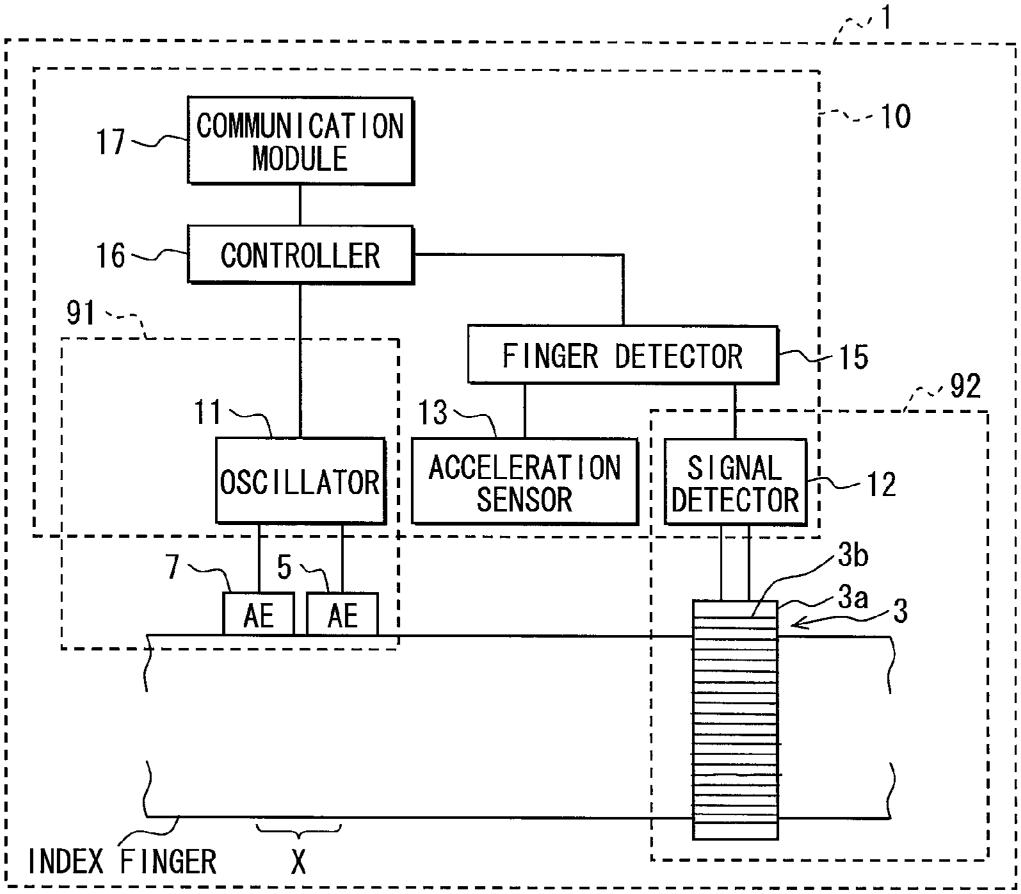
FIG. 1 is a block diagram of a remote control terminal according to a first embodiment of the present disclosure.

A remote control terminal 1 according to a first embodiment of the present disclosure is described below with reference to FIG. 1. As shown in FIG. 1, the remote control terminal 1 is ring-shaped and wearable on an index finger of a user. The remote control terminal 1 includes a ring-shaped toroidal coil 3, a pair of application electrodes 5 and 7, and a control unit 10. The remote control terminal 1 is used by inserting the index finger through the toroidal coil 3. The electrodes 5 and 7 are located away from the toroidal coil 3 in an axis direction of the index finger and arrange in parallel with each other in the axis direction. The control unit 10 is fixed to a portion of an outer surface of the toroidal coil 3. The electrodes 5 and 7 are fixed to the control unit 10 so that a surface of the index finger inserted through the toroidal coil 3 can be in contact with of the electrodes 5 and 7.

It is not essential that the toroidal coil 3, the control unit 10, and the electrodes 5 and 7 are physically fixed directly to each other. For example, the toroidal coil 3, the control unit 10, and the electrodes 5 and 7 can be integrated together through a ring-shaped housing made of resin or the like. In this case, the control unit 10 can be located inside an ornament on the ring-shaped housing. In an example shown in FIG. 1, the remote control terminal 1 is worn on the finger in such a manner that the toroidal coil 3 is located closer to a base of the finger than the electrodes 5 and 7. Alternatively, the remote control terminal 1 can be worn on the finger in such a manner that the toroidal coil 3 is located closer to a tip of the finger than the electrodes 5 and 7.

The electrodes 5 and 7 are electrically connected to an oscillator 11 of the control unit 10 so that an alternating-current (AC) signal can be applied between the electrodes 5 and 7 by the oscillator 11. When an electric current flows through the index finger inserted through the toroidal coil 3 in the axis direction (i.e., direction crossing the toroidal coil 3), a voltage depending on the current is induced in the toroidal coil 3 and inputted to a signal detector 12 of the control unit 10. Specifically, the toroidal coil 3 is configured as a current transformer having a doughnut-shaped core 3*a* and a wire 3*b* wound on the core 3*a*. Due to electromagnetic induction, the voltage depending on the current flowing in the axis direction is induced across ends of the wire 3*b* and detected by the signal detector 12.

As described above, according to the embodiment, the current flowing in the axis direction is detected by using the toroidal coil 3. A reason for this is that the current is the AC signal applied through the electrodes 5 and 7. Alternatively, a direct-current (DC) signal can be applied between the electrodes 5 and 7. In this case, the current flows through the index finger inserted through the toroidal coil 3 in the axis direction can be detected by using a Hall effect device. Specifically, the Hall effect device is placed in a gap of a ring-shaped core, and the current is detected by detecting a magnetic field applied to the Hall effect device in the gap.

The electrodes 5 and 7 and the oscillator 11 are hereinafter sometimes collectively called the "signal source 91". The toroidal coil 3 and the signal detector 12 are hereinafter sometimes collectively called the "current sensor 92".

Next, the principle of operation of the remote control terminal 1 is described by considering two cases: the first case where the index finger on which the remote control terminal 1 is worn separates from a thumb of the same hand as the index finger due to a motion of a body of the user, and the second case where the index finger on which the remote control terminal 1 is worn comes into contact with the thumb of the same hand as the index finger due to the motion of the body of the user.

In the first case where the index finger is separated from the thumb, even when the AC signal is applied between the electrodes 5 and 7, the AC signal flows through almost only a body portion, within a region X shown in FIG. 1, between the electrodes 5 and 7. Therefore, the voltage detected by the current sensor 92 is zero.

In contrast, in the second case where the index finger is in contact with the thumb, a closed loop conducting path is formed with the index finger, the thumb, and a portion of the body connecting bases of the index finger and the thumb. Thus, the toroidal coil 3 is electrically sandwiched between the electrodes 5 and 7 so that the AC signal can flow through the portion through which the toroidal coil 3 is inserted. As a result, the voltage (root mean square value or effective value) detected by the current sensor 92 becomes greater than zero.

According to the first embodiment, the remote control terminal 1 determines whether the index finger and the thumb come in contact with or separate from each other due to the motion of the user's body based on the voltage detected by the current sensor 92.

Figure 2:
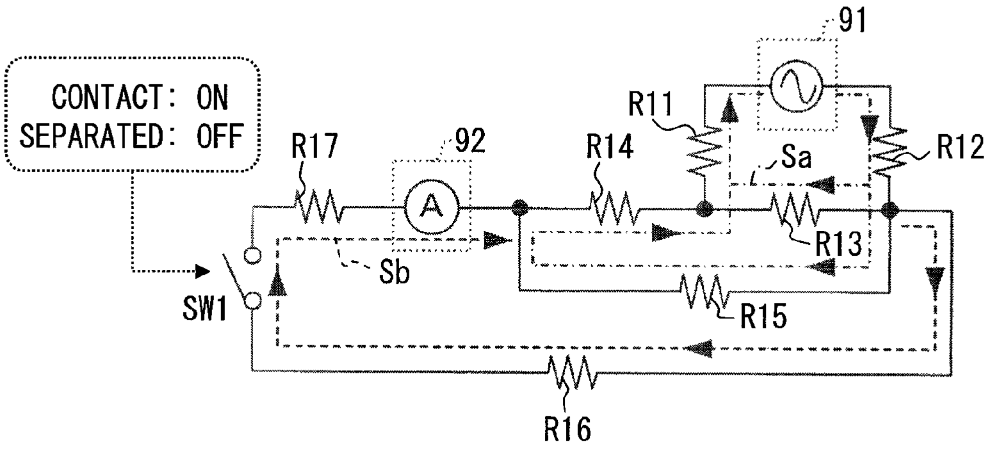
FIG. 2 is a diagram illustrating an equivalent circuit of a measurement system of the remote control terminal.

FIG. 2 is a diagram of an equivalent circuit of a measurement system of the remote control terminal 1 when the remote control terminal 1 is worn on the index finger in such a manner that the electrode 7 is located closer to the base of the index finger than the toroidal coil 3. For the sake of simplicity, in FIG. 2, a resistance of the body through which the AC signal applied between the electrodes 5 and 7 flows is represented in a lumped parameter system. Specifically, a resistor R11 represents a contact resistance between the electrode 5 and the finger. A resistor R12 represents a contact resistance between the electrode 7 and the finger. A resistor R13 represents an electrical resistance of a surface of the body portion within the region X between the electrodes 5 and 7. A resistor R14 represents an electrical resistance of a surface of a body portion from the toroidal coil 3 to the electrode 5.

A resistor R15 represents an electrical resistance of a conducting path that extends inside the body between the electrodes 5 and 7 after bypassing the electrode 5 toward the toroidal coil 3. A resistor R16 represents an electrical resistance of a body portion from the electrode 7 to the tip of the thumb through the base of the index finger. A resistor R17 represents a resistance of a body portion from the tip of the index finger to the toroidal coil 3. A switch SW represents a contact and a separation between the index finger and the thumb. Specifically, when the switch is open, the index finger and the thumb are separated from each other. In contrast, when the switch is closed, the index finger and the thumb are in contact with each other. An AC power source represents the signal source 91. An ammeter represents the current sensor 92.

In FIG. 2, an electrical signal Sa flows between the electrodes 5 and 7 regardless of whether the index finger and the thumb are in contact with or separated from each other. In contrast, an electrical signal Sb flows between the electrodes 5 and 7 only when the index finger and the thumb are in contact with each other.

When the index finger on which the remote control terminal 1 is worn comes into contact with and separates from the thumb, the flow of the electrical signal changes as shown in FIG. 2 so that the voltage detected by the current sensor 92 can change. The remote control terminal 1 detects the fact that the fingers come into contact with or separate from each other due to the motion of the user's body based on the changing voltage detected by the current sensor 92.

Referring to FIG. 1, the control unit 10 further includes an acceleration sensor 13, a finger detector 15, a controller 16, and a communication module 17 in addition to the oscillator 11 and the signal detector 12. The acceleration sensor 13 detects impact on the control unit 10 as acceleration. When the index finger on which the remote control terminal 1 is worn moves and comes into contact with, i.e., hits against the thumb of the same hand as the index finger, impact is applied to the control unit 10 and detected by the acceleration sensor 13. Likewise, the acceleration sensor 13 can detect the impact on the control unit 10 when other fingers (e.g., the thumb and a middle finger) of the same hand as the index finger on which the remote control terminal 1 is worn come into contact with each other.

Figure 3:
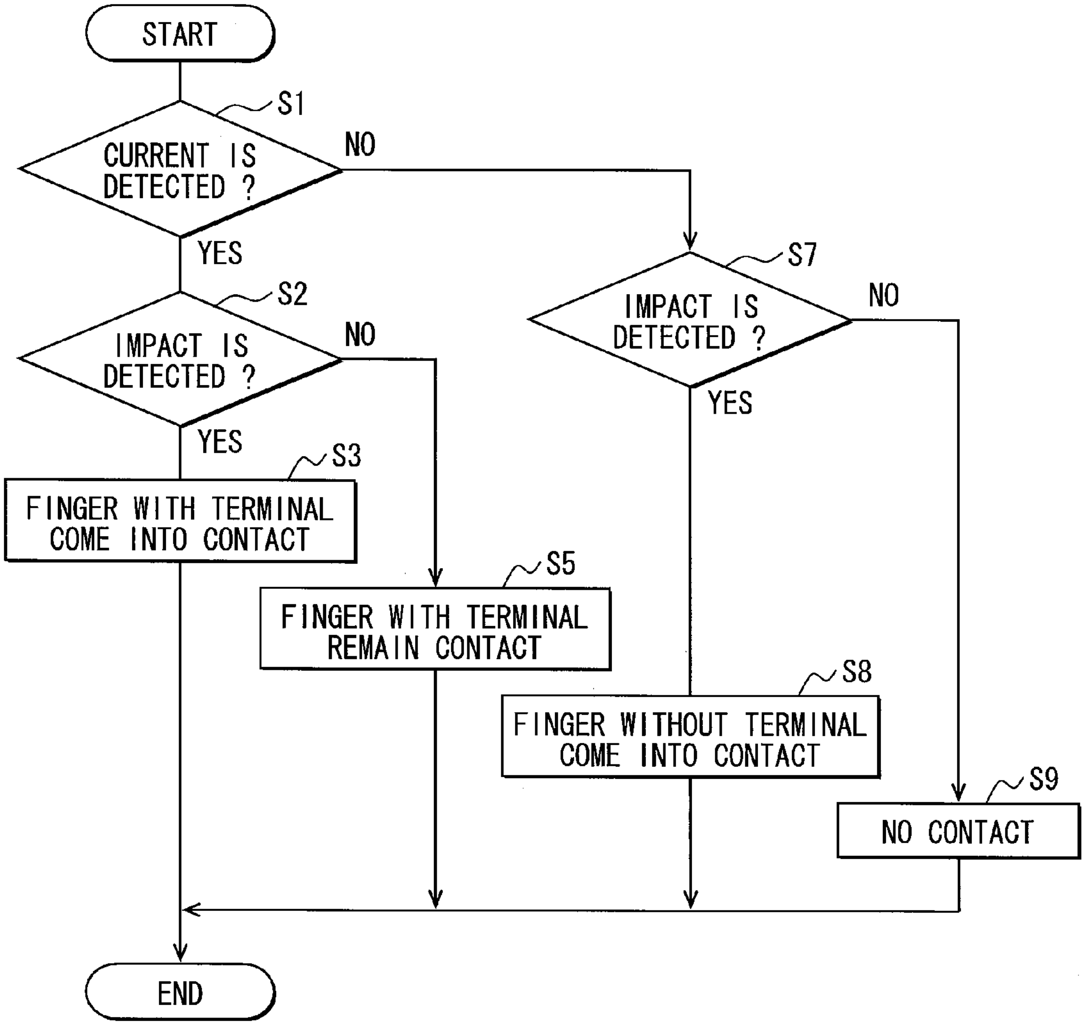
FIG. 3 is a flow diagram of an interrupt process performed by a finger detector of the remote control terminal.

The finger detector 15 detects the motion of the user's fingers based on signals received from the signal detector 12 and the acceleration sensor 13. FIG. 3 is a flow diagram of an interrupt process regularly performed by the finger detector 15. The finger detector 15 and the controller 16 are configured as a microcomputer having a CPU, a ROM, and a RAM. The controller 16 regularly issues a first command to cause the oscillator 11 to apply the AC signal between the electrodes 5 and 7. Further, the controller 16 issues a second command to cause the finger detector 15 to perform the interrupt process. It is noted that the second command is issued synchronously with the first command. In response to the second command, the CPU of the finger detector 15 performs the interrupt process shown in FIG. 3 based on programs stored in the ROM of the finger detector 15.

As shown in FIG. 3, the interrupt process starts at S1, where the finger detector 15 determines where the current flowing through the index finger is detected through the toroidal coil 3. If the current is detected corresponding to YES at S1, the interrupt process proceeds to S2, where the finger detector 15 determines whether the impact is detected through the acceleration sensor 13. If the impact is detected corresponding to YES at S2, the interrupt process proceeds to S3, where the finger detector 15 determines that the finger (e.g., index finger) on which the remote control terminal 1 is worn comes into contact with (i.e., hits against) the thumb. After S3, the interrupt process is temporally suspended. For example, when the index finger on which the remote control terminal 1 is worn and the thumb of one hand come into contact with a palm of the other hand at the same time, the current and impact are detected so that the interrupt process can proceed from S1 to S3 by way of S2. Even in such a case, the finger detector 15 determines at S3 that the index finger comes into contact with the thumb. The same is true for S5, S8, and S9, which are described later.

If the impact is not detected corresponding to NO at S2, the interrupt process proceeds to S5, where the finger detector 15 determines that the finger (e.g., index finger) on which the remote control terminal 1 is worn remains contact with the thumb. After S5, the interrupt process is temporally suspended.

If the current is not detected corresponding to NO at S1, the interrupt process proceeds to S7, where the finger detector 15 determines whether the impact is detected through the acceleration sensor 13 like at S2. If the impact is detected corresponding to YES at S7, the interrupt process proceeds to S8, where the finger detector determines that a finger (e.g., middle finger) on which the remote control terminal 1 is not worn comes into contact with the thumb. After S8, the interrupt process is temporally suspended. In contrast, if the impact is not detected corresponding to NO at S7, the interrupt process proceeds to S9, where the finger detector determines that there is no contact between the fingers of the hand on which the remote control terminal 1 is worn. After S9, the interrupt process is temporally suspended. After a predetermined interval has elapsed, the suspended interrupt process is restarted.

In the above mentioned manner, the finger detector 15 determines which fingers are in contact with each other based on the signals received from the signal detector 12 and the acceleration sensor 13. The controller 16 sends a control command signal through the communication module 17 to the target apparatus based on the result of detect by the finger detector 15. Thus, the target apparatus is controlled based on the control command signal. The target apparatus is not limited to a specific apparatus, and the control command signal can vary according to the target apparatus.

For example, when the target apparatus is a television, the controller 16 can transmit a volume command signal to the television to change a volume of the television each time the index finger comes into contact with the thumb, and can transmit a channel command signal to the television to change a channel of the television each time the middle finger comes into contact with the thumb. For another example, when the target apparatus is an air conditioner, the controller 16 can transmit a temperature command signal to the air conditioner to change a temperature setting of the air conditioner each time the index finger comes into contact with the thumb, and can transmit a mode command signal to the air conditioner to change an operation mode of the air conditioner, for example, between a dehumidification mode, a cooling mode, and a heating mode, each time the middle finger comes into contact with the thumb.

As described above, according to the first disclosure, the remote control terminal 1 can detect three or more different conditions of the motion of the user and transmit two or more different control command signals to the target apparatus. Further, since the remote control terminal 1 has a simple structure, the remote control terminal 1 can be reduced in size. Therefore, the remote control terminal 1 is easy for a user to wear and take off.

Although not shown in FIG. 3, the number of types of command signal to be sent to the target apparatus can be increased by referring to a change in the detection result (any one of S3, S5, S8, and S9). For example, assuming that the detection result changes from S5 to S3 without passing S9, the finger detector 15 can determine that the middle finger comes into contact with one of the index finger and the thumb that remain contact with each other. For example, when the target apparatus is the television, the controller 16 can transmit a brightness command signal to the television to change a brightness of the television each time such a contact occurs. For another example, when the target apparatus is a personal computer, the controller 16 can interpret the contact between the index finger and the thumb to mean that a shift key remains pressed down.

The oscillator 11 is constant voltage driven or constant current driven and applies the AC signal (AC voltage) to the body portion between the electrodes 5 and 7. The AC signal is not limited to a specific waveform. For example, the AC signal can have a triangle waveform, a sinusoidal waveform, a square waveform, or a sawtooth waveform.

The signal detector 12 detects the voltage induced in the toroidal coil 3. The signal detector 12 is not limited to a specific detector. For example, the signal detector 12 can include an amplifier circuit connected between the ends of the toroidal coil 3 to amplify the voltage across the toroidal coil 3 and a rectifier circuit for rectifying (i.e., converting) an output signal (AC signal) of the amplifier circuit into a DC signal. In this case, an output signal of the rectifier circuit can be converted into a digital value as a current measurement value, and the current measurement value can be inputted to the finger detector 15. Thus, the root mean square value of the voltage across the toroidal coil 3 can be converted into the root mean square value of the current flowing in the axis direction of the body portion on which the toroidal coil 3 is worn. Alternatively, signal detectors disclosed in JP-4683148 can be used as the signal detector 12.

Second Embodiment

A remote control terminal 51 according to a second embodiment of the present disclosure is described below with reference to FIGS. 4A and 4B. A difference of the second embodiment from the first embodiment is as follows.

In the remote control terminal 1 according to the first embodiment, the index finger is inserted through the toroidal coil 3, and the electrodes 5 and 7 are in contact with the surface of the index finger.

Figure 4A:
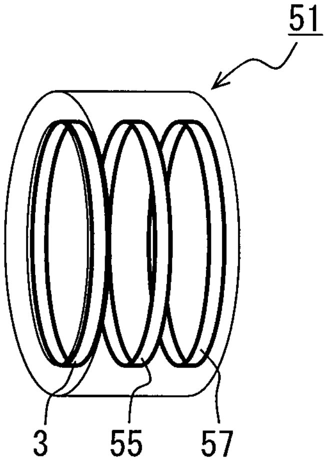
FIG. 4A is a diagram illustrating a perspective transparent view of a remote control terminal according to a second embodiment of the present disclosure.
Figure 4B:
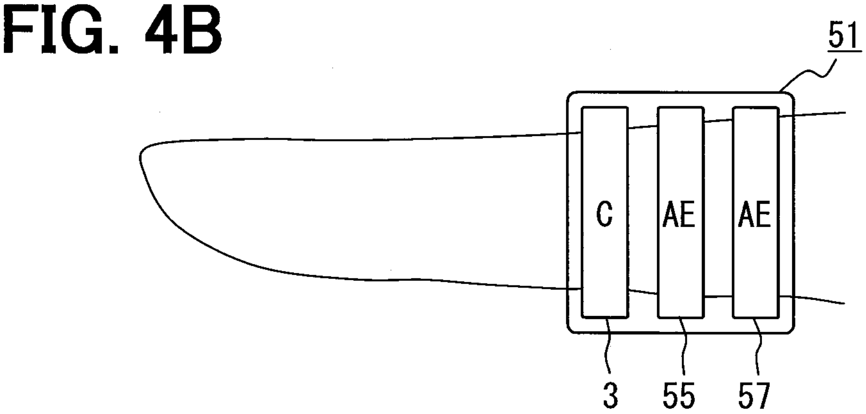
FIG. 4B is a diagram illustrating a finger on which the remote control terminal of FIG. 4A is worn.
Figure 5A:
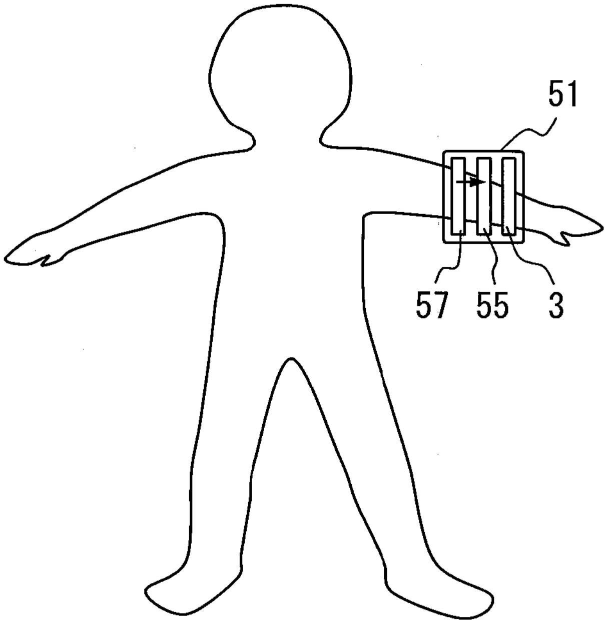
FIG. 5A is a diagram illustrating a remote control terminal according to a modification of the second embodiment.
Figure 5B:
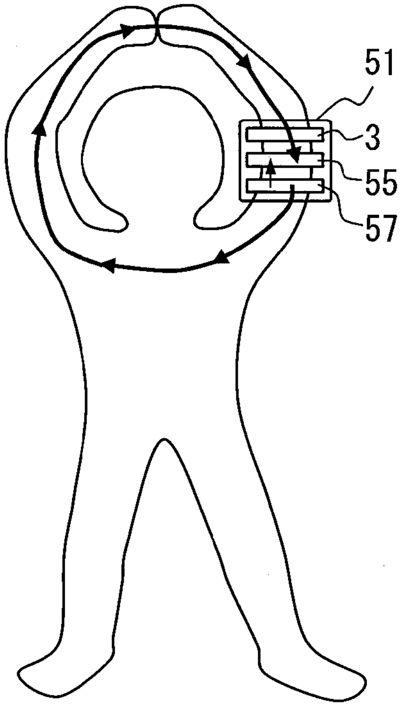
FIG. 5B is a diagram illustrating a principle of operation of the remote control terminal of FIG. 5A.

In the remote control terminal 51 according to the second embodiment, as shown in FIGS. 4A and 4B, the electrodes 5 and 7 are replaced with ring-shaped application electrodes 55 and 57, and the index finger is inserted through not only the toroidal coil 3 but also the electrodes 55 and 57. Alternatively, as shown in FIG. 5A, the remote control terminal 51 can be bracelet-shaped so that the user can wear the remote control terminal 51 on an arm. In this case, as shown in FIG. 5B, when the user holds hands, a closed loop conducting path is formed with the body including the arms so that the current can flow through the conducting path. Therefore, whether or not the user holds hands can be detected based on the current. Thus, the user can control the target apparatus by holding hands together or separating the hands from each other. Alternatively, the user can wear the bracelet-shaped remote control terminal 51 on a leg.

Third Embodiment

Figure 6A:
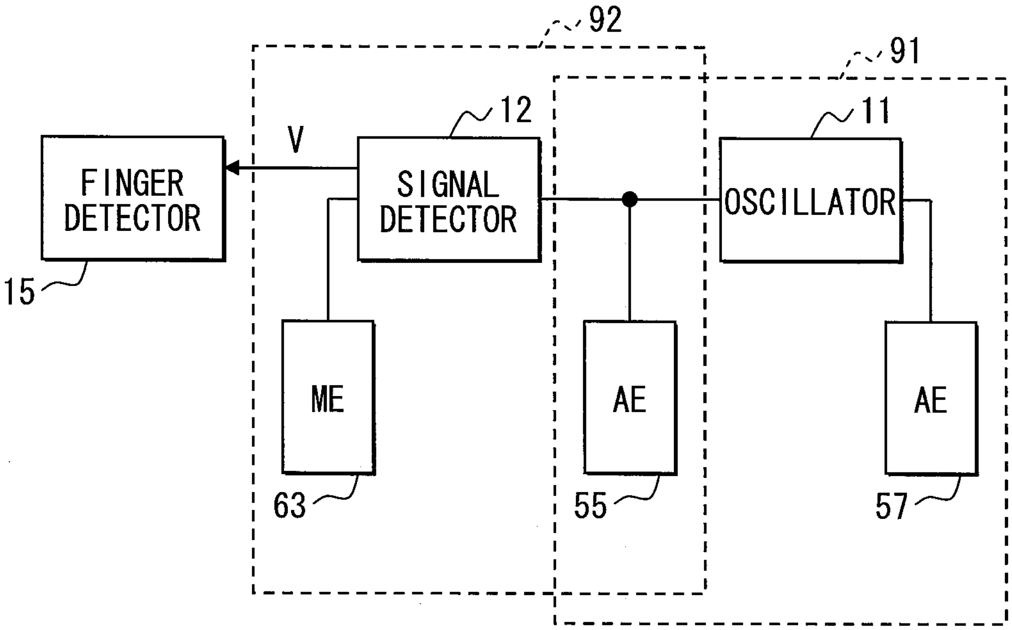
FIG. 6A is a block diagram of a remote control terminal according to a third embodiment of the present disclosure.

A remote control terminal 61 according to a third embodiment of the present disclosure is described below with reference to FIGS. 6A and 6B. A difference of the third embodiment from the preceding embodiments is as follows. The remote control terminal 61 has a ring-shaped measurement electrode 63 instead of the toroidal coil 3. Further, like the second embodiment, the remote control terminal 61 has the ring-shaped electrodes 55 and 57.

Figure 6B:
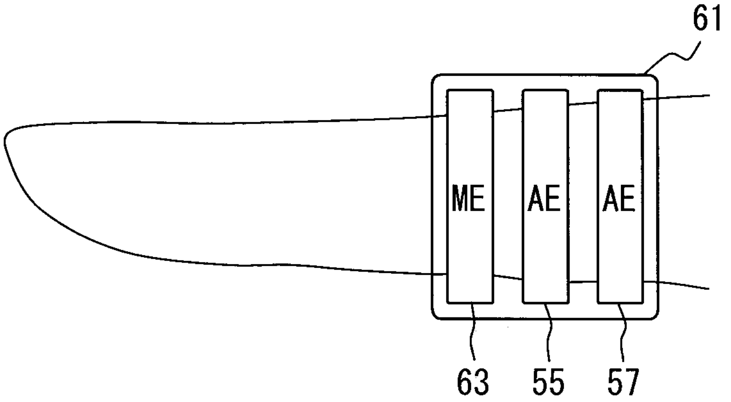
FIG. 6B is a diagram illustrating a finger on which the remote control terminal of FIG. 6A is worn.

As shown in FIG. 6B, the electrode 55 is located between the electrode 57 and the measurement electrode 63. That is, the electrode 55 is located closer to the measurement electrode 63 than the electrode 57. As shown in FIG. 6A, the signal detector 12 detects a voltage V between the electrode 55 and the measurement electrode 63 and outputs the detected voltage V to the finger detector 15. If the detected voltage V is greater than a predetermined threshold Vth, the finger detector 15 determines that the index finger on which the remote control terminal 61 is worn is in contact with the thumb of the same hand as the index finger. In contrast, if the detected voltage V is equal to or less than the predetermined threshold Vth, the finger detector 15 determines that the index finger is separated from the thumb. A reason for this is that the detected voltage V is larger when the index finger is in contact with the thumb than when the index finger is separated from the thumb.

Alternatively, the signal detector 12 can measure a phase lag of the AC signal inputted from the measurement electrode 63 with respect to the AC signal applied between the electrodes 55 and 57 based on the voltage (AC signal) between the electrode 55 and the measurement electrode 63. The phase lag is positive in a delay direction. In this case, if the measured phase lag is greater than a predetermined threshold, the finger detector 15 can detect that the index finger on which the remote control terminal 61 is worn is in contact with the thumb of the same hand as the index finger. In contrast, if the measured phase lag is equal to or less than the predetermined threshold, the finger detector 15 can detect that the index finger is separated from the thumb. As described below, it is not essential that the signal source 91 and the current sensor 92 are separate circuits.

Fourth Embodiment

A remote control terminal 71 according to a fourth embodiment of the present disclosure is described below with reference to FIGS. 7A and 7B. A difference of the fourth embodiment from the preceding embodiments is as follows. The remote control terminal 71 has ring-shaped electrodes 75 and 77 like the electrodes 55 and 57 of the preceding embodiments. It is noted that the remote control terminal 71 has neither the toroidal coil 3 nor the measurement electrode 63 of the preceding embodiments.

Figure 7A:
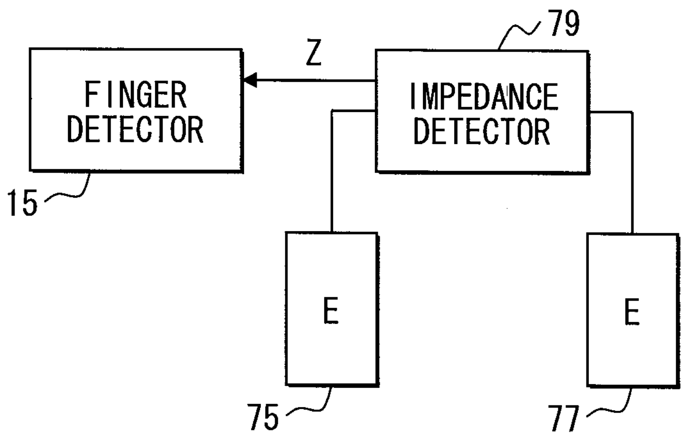
FIG. 7A is a block diagram of a remote control terminal according to a fourth embodiment of the present disclosure.
Figure 7B:
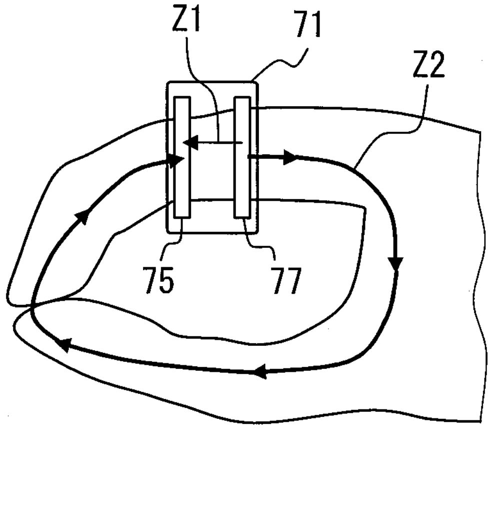
FIG. 7B is a diagram illustrating a finger on which the remote control terminal of FIG. 7A is worn.

As shown in FIG. 7A, the remote control terminal 71 has an impedance detector 79. The impedance detector 79 detects an impedance Z between the electrodes 75 and 77 and outputs the detected impedance Z to the finger detector 15. When the index finger on which the remote control terminal 71 is worn is in contact with the thumb, the detected impedance Z is calculated as follows:

$$Z=1/(1/Z1+1/Z2)=Z1\cdot Z2/(Z1+Z2)$$

Z1 represents an impedance of a conducting path extending between the electrodes 75 and 77 without passing a contact point between the index finger and the thumb. Z2 represents an impedance of a conducting path extending between the electrodes 75 and 77 through the contact point between the index finger and the thumb.

In contrast, when the index finger is separated from the thumb, the detected impedance Z is calculated as follows:

$$Z=Z1$$

Therefore, the detected impedance Z is smaller when the index finger is in contact with the thumb than when the index finger is separated from the thumb. For this reason, if the detected impedance Z is greater than a predetermined threshold Zth, the finger detector 15 determines that the index finger on which the remote control terminal 61 is worn is separated from the thumb of the same hand as the index finger. In contrast, if the detected impedance Z is equal to or less than the predetermined threshold Zth, the finger detector 15 determines that the index finger is in contact with the thumb.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure. For example, the structure to detect whether the fingers are in contact with or separated from each other is not limited to those described in the embodiments. For example, structures disclosed in US 2010/0219989 or US 2010/0220054 corresponding to JP-2010-282345A can be employed as a structure to detect whether the fingers are in contact with or separated from each other.

In the embodiment, the control command signal is transmitted to the target apparatus by wireless so that operability of the remote control terminal can be improved. Alternatively, the control command signal can be transmitted to the target apparatus by wired.

The correspondence between the terms in the embodiments and claims is as follows. Each of the remote control terminals 1, 51, 61, and 71 corresponds to a control terminal. The signal source 91 corresponds to a signal source. The current sensor 92 corresponds to a signal detector. A combination of the signal source 91 and the current sensor 92 corresponds to a contact detector. The acceleration sensor 13 corresponds to an impact detector. The finger detector 15 corresponds to a motion detector. The communication module 17 corresponds to a transmitter.

What is claimed is:

1. A control terminal wearable on a body of a user to allow the user to control a target object, the control terminal comprising:

a contact detector configured to be mounted on a surface of a first portion of the body to detect whether the first portion is in contact with or separated from a second portion of the body based on whether a closed loop conducting path is formed with the first portion and the second portion;

an impact detector configured to detect an impact on the control terminal;

a motion detector configured to detect a motion of the user based on a result of detection by the contact detector and a result of detection by the impact detector; and a transmitter configured to transmit a control signal to the target object according to the detected motion, wherein the motion detector detects the motion of the user based on a combination of the result of detection by the contact detector and the result of detection by the impact detector at a predetermined time interval, the motion detector detects the motion of the user based on a combination of a change in the result of detection by the contact detector and a change in the result of detection by the impact detector, and when the contact detector detects the contact between the first portion and the second portion at the same time when the impact detector detects the impact, the motion detector detects that the first portion and the second portion come into contact with each other.

2. The control terminal according to claim 1, wherein the contact detector includes a signal source and a signal detector, the signal source applies an electrical signal to the surface of the first portion of the body along the conducting path, and the signal detector detects the electrical signal.

3. The control terminal according to claim 1, wherein the first portion is a first finger of one of a right hand and a left hand of the user, the second portion is a second finger of the one of the right hand and the left hand of the user, and the control terminal is ring-shaped and wearable on the first finger.

4. The control terminal according to claim 1, wherein the transmitter transmits the control signal to the target terminal by wireless.

5. The control terminal according to claim 1, wherein when the contact detector continuously detects the contact between the first portion and the second portion from a first time to a second time, and the impact detector momentarily detects the impact at the first time, the motion detector detects that the first portion and the second portion remain in contact with each other from the first time to the second time.

6. The control terminal according to claim 5, wherein when the impact detector momentarily detects the impact at a third time between the first time and the second time, the motion detector detects that a third portion of the body comes into contact with one of the first portion and the second portion which remain contact with each other.

* * * * *